May 29, 1928.
D. I. MUNSON
SNOWPLOW
Filed May 10, 1926
1,671,836
2 Sheets-Sheet 1
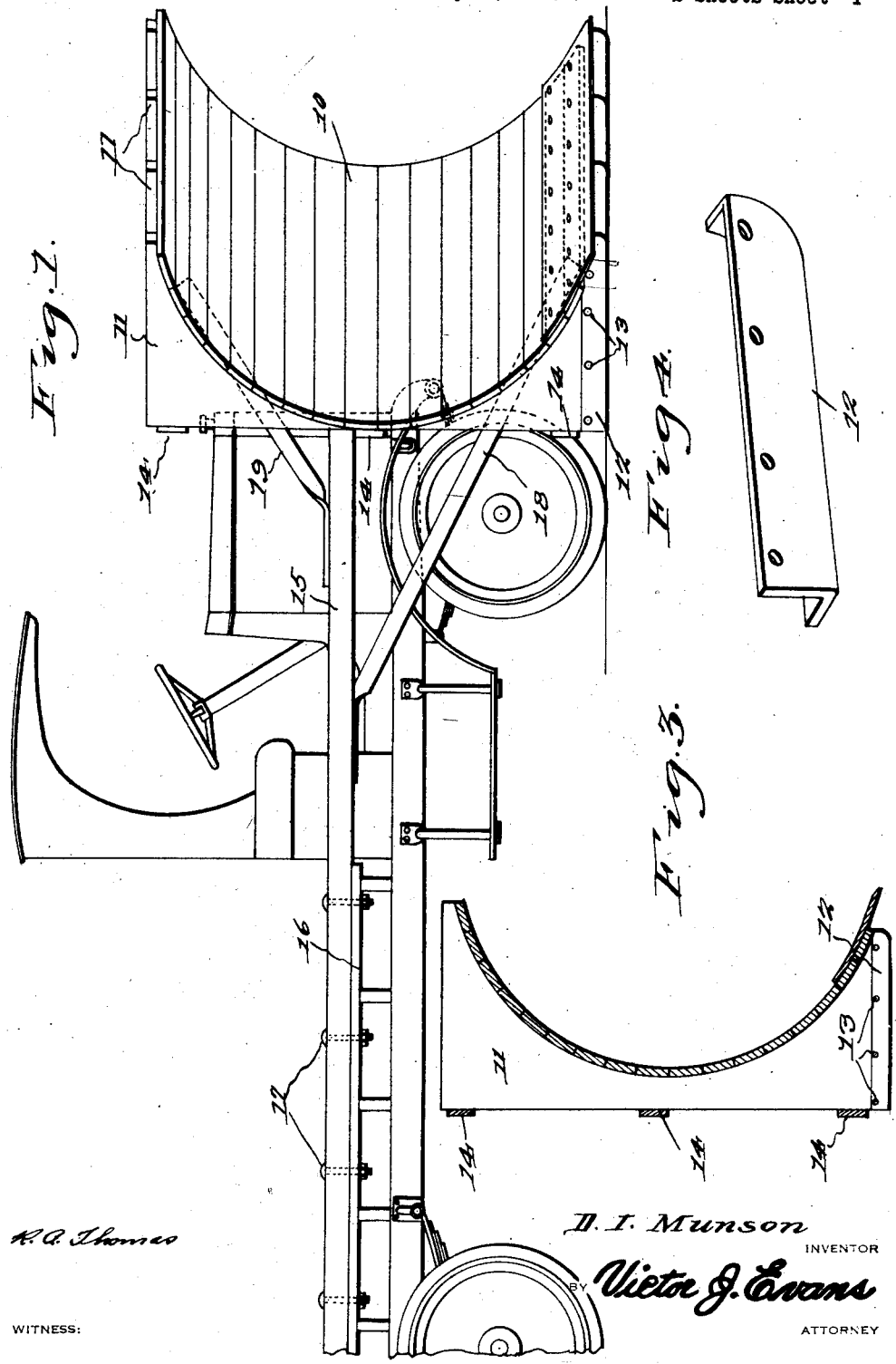

May 29, 1928.
D. I. MUNSON
SNOWPLOW
Filed May 10, 1926
1,671,836
2 Sheets-Sheet 2
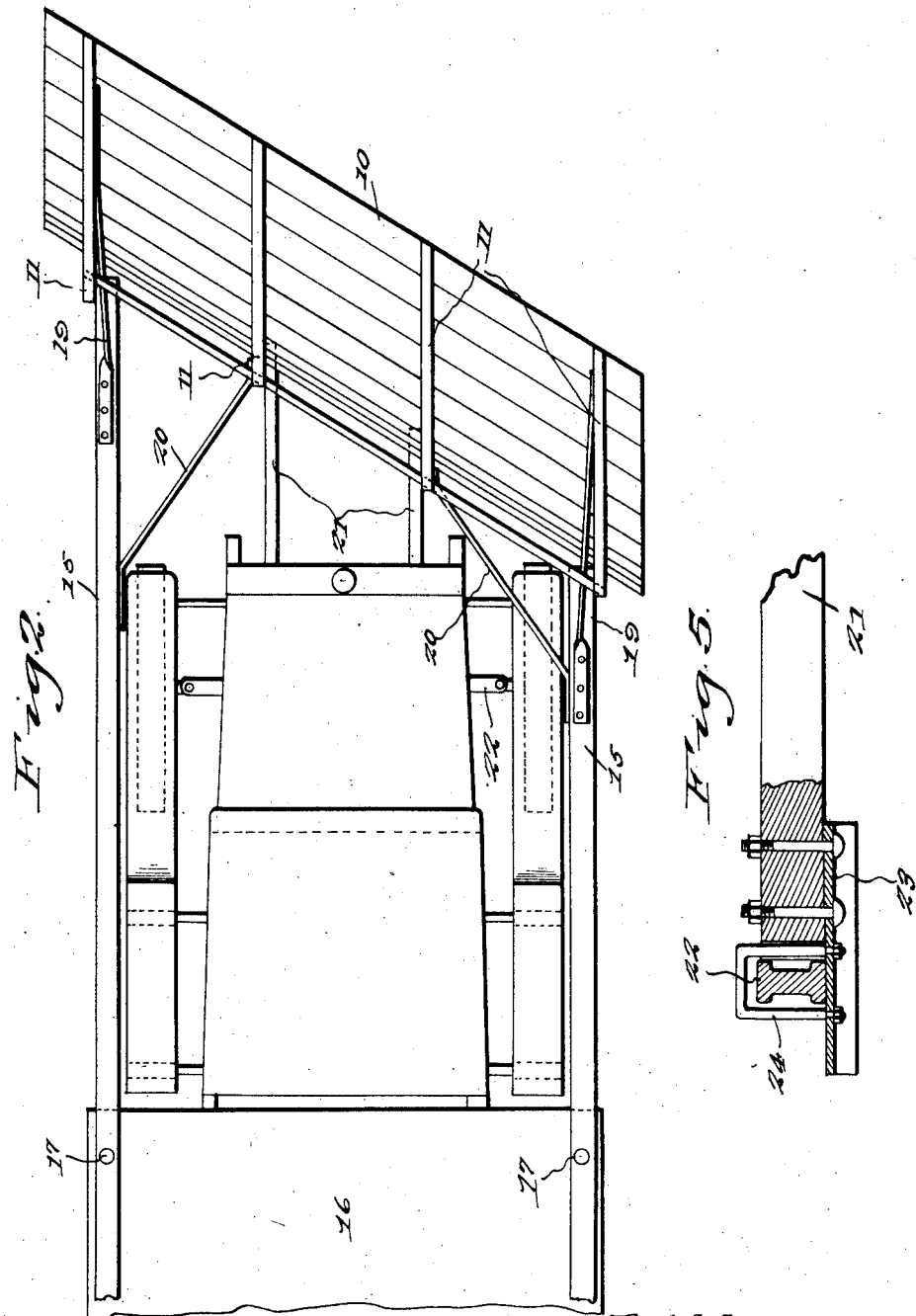

Patented May 29, 1928.

1,671,836

UNITED STATES PATENT OFFICE.

DAVID I. MUNSON, OF RICHFORD, NEW YORK.

SNOWPLOW.

Application filed May 10, 1926. Serial No. 108,136.

This invention relates to snow plows and has for an object the provision of a plow which may be attached to a truck, tractor or other motor driven vehicle.

Another object of the invention is the provision of novel means for securing the plow to the truck so that the scoop of the plow may pass over obstructions and will thereafter have a tendency to return to its normal horizontal position.

Another object of the invention is the provision of a novel construction of scoop wherein the ribs of the scoop are extended to provide runners for the plow to ride on, the scoop being attached to timber arms which run backwards from the scoop the full length of the track and are fastened to the platform of the truck by bolts, which timber arms resist the tendency of the scoop to move to one side when pushing heavy drifts of snow or under any conditions.

With the above and other objects in view, the invention further includes the following novel features and details of construction, to be hereinafter more fully described, illustrated in the accompanying drawings and pointed out in the appended claim.

In the drawings:—

Figure 1 is a side elevation of a truck with the invention applied.

Figure 2 is a top plan view with part of the truck broken away.

Figure 3 is a vertical sectional view through the scoop.

Figure 4 is a detail perspective view of one of the runner shoes.

Figure 5 is an enlarged fragmentary view partly in section illustrating the connection between the plow and the front axle of the truck.

Referring to the drawings in detail wherein like characters of reference denote corresponding parts, the reference character 10 indicates the scoop of the plow which may be of suitable material, but is shown as including a plurality of horizontally disposed wooden members arranged in substantially semi-circular form. These wooden members are secured to ribs 11 which are spaced transversely of the scoop and which extend vertically, the connection between the members 10 and the ribs 11 being such that when the scoop is in position for use, the ribs 11 will be arranged substantially parallel with the longitudinal center of the truck, while the scoop will be arranged at a transverse incline so as to direct the snow to one side of the truck in substantially the same manner as a plow when turning a furrow. The ribs 11 extend downward and provide runners for supporting the scoop. These runners are equipped with metal shoes 12 of substantially L-shaped cross section, while fastening devices 13 extend through the shoes 12 into the runners. The shoes are thus secured to the sides of the runners and may be readily replaced when worn. The ribs are connected by vertically spaced bars 14.

The scoop is connected to the truck by means of attaching arms 15. One of these arms is located upon each side of the truck and extends rearwardly and is rigidly connected to the truck platform 16 by bolts or other fastening devices 17, the point of connection being spaced a relatively great distance from the scoop so as to provide a more or less resilient connection between the scoop and truck. This permits of limited vertical movement of the scoop. One of the arms 15 is considerably longer than the other so as to provide for the inclined position of the scoop and each arm is connected to the scoop by a forwardly and downwardly inclined brace 18 and an upwardly and forwardly inclined brace 19. These braces are connected to the outermost ribs 11, while other braces 20 connect with the intermediate ribs. The scoop is thus thoroughly braced and is rigidly secured to the outer ends of the arms 15.

Secured to the intermediate braces 11 and extending rearwardly therefrom are push beams 21. These beams are adapted to have their inner ends abut the front axle 22 of the truck. The inner ends of the beams 21 also have connected thereto a rearwardly extending bar 23 which passes beneath the axle 22 and carries a U-bolt 24. The bolt 24 loosely embraces the axle 22 and one of its arms extends down through the beam 21. A loose or flexible connection is thus provided between the inner ends of the beams 21 and the truck so that the scoop may be permitted the vertical movement before mentioned.

In use, the scoop will travel directly in front of the vehicle, the tendency of the scoop to move to one side due to the weight of the snow being resisted by the timber arms 15 which run backwards from the scoop the full length of the platform 16 of the truck, being fastened to the platform 16 of the truck by bolts 17, which timber arms 15 guide the scoop 10 directly ahead and resist any tendency of the scoop to move to one side. Due to the flexibility of the arms 15, the scoop will be permitted to pass over obstructions, but the flexibity of these arms will cause the scoop to return immediately to its normal position. The operation of removing the snow will thus be effectually performed.

The invention is susceptible of various changes in its form, proportions and minor details of construction and the right is herein reserved to make such changes as properly fall within the scope of the appended claim.

Having described the invention what is claimed is:

In combination with a motor driven vehicle, a scoop adapted to be disposed at a transversely horizontal incline with respect to the vehicle, said scoop including transversely spaced vertically disposed ribs extending parallel with the longitudinal center line of the vehicle, the lower extremity of the ribs being extended forwardly in a horizontal plane beneath the lower edge of the scoop to define a runner for the latter, a shoe secured to each runner, transverse members connecting the ribs at the rear thereof, arms extending longitudinally upon the opposite sides of the vehicle and having their forward ends connected to the scoop, a pair of divergently disposed braces projecting above and below said arms and connected with the latter, and having their forward ends connected with said scoop adjacent the free ends thereof, additional convergingly disposed braces projecting from said arms toward the center of the scoop and connected with the intermediate rib, and push beams having their forward ends connected with the scoop and their rear ends abutting and loosely connected with the front axle of the vehicle.

In testimony whereof I affix my signature.

DAVID I. MUNSON.